United States Patent
Yonekura et al.

(10) Patent No.: US 8,541,141 B2
(45) Date of Patent: Sep. 24, 2013

(54) FUEL CELL SYSTEM

(75) Inventors: Kenji Yonekura, Yokohama (JP); Hitoshi Igarashi, Yokohama (JP); Tetsuya Kamihara, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 664 days.

(21) Appl. No.: 12/293,163

(22) PCT Filed: Mar. 16, 2007

(86) PCT No.: PCT/IB2007/000661
§ 371 (c)(1),
(2), (4) Date: Sep. 16, 2008

(87) PCT Pub. No.: WO2007/107838
PCT Pub. Date: Sep. 27, 2007

(65) Prior Publication Data
US 2009/0087702 A1    Apr. 2, 2009

(30) Foreign Application Priority Data

Mar. 17, 2006  (JP) ................ 2006-074428

(51) Int. Cl.
*H01M 8/04*  (2006.01)
(52) U.S. Cl.
USPC ........................................ 429/428
(58) Field of Classification Search
None
See application file for complete search history.

(56) References Cited

U.S. PATENT DOCUMENTS

| | | | |
|---|---|---|---|
| 2004/0229088 A1* | 11/2004 | Hayashi et al. | 429/13 |
| 2005/0202293 A1 | 9/2005 | Kagami et al. | |
| 2006/0008689 A1 | 1/2006 | Yonekura et al. | |
| 2006/0093880 A1* | 5/2006 | Igarashi et al. | 429/22 |
| 2007/0054165 A1 | 3/2007 | Yoshida et al. | |

FOREIGN PATENT DOCUMENTS

| | | |
|---|---|---|
| EP | 1 575 111 A1 | 9/2005 |
| EP | 1 615 283 A1 | 1/2006 |
| JP | 2004-173450 A | 6/2004 |
| JP | 2004173450 A * | 6/2004 |
| JP | 2005-026054 | 1/2005 |
| JP | 2006-278276 | 10/2006 |
| WO | 2005/004269 A2 | 1/2005 |
| WO | 2005/078845 A2 | 8/2005 |

OTHER PUBLICATIONS

Machine Translation of Japanese Patent Document JP 2004173450 to Hasuka et al., published Jun. 17, 2004.*

* cited by examiner

*Primary Examiner* — Patrick Ryan
*Assistant Examiner* — Wyatt McConnell
(74) *Attorney, Agent, or Firm* — Young Basile

(57) ABSTRACT

A fuel cell system and method of controlling a fuel cell system capable of preventing deterioration in performance when the system reinitiates a normal operation from an idle stop state. For a predetermined time after reinitiating the supply of fuel gas and oxidant gas from the idle stop state, discharge of off-gas occurs and the cessation of fuel gas and oxidant gas supply is prohibited.

24 Claims, 5 Drawing Sheets

FUEL CELL SYSTEM

CROSS-REFERENCE TO RELATED APPLICATION

This application claims priority from Japanese Patent Application Serial No. 2006-074428, filed Mar. 17, 2006, which is incorporated herein in its entirety by reference.

FIELD OF THE INVENTION

The present invention relates in general to a fuel cell system.

BACKGROUND

A conventional fuel cell system generally includes a fuel cell and a secondary cell. The conventional fuel cell system further has an idle stop function in which the fuel cell is stopped from generating electricity and power is supplied to a load only from the secondary cell under a prescribed condition. As shown in Japanese Patent Laid-Open Publication No. 2005-26054, when the fuel cell once again starts to generate electricity after the idle stop function is performed, it is determined whether there is any deterioration in the performance of the fuel cell (e.g., response delay in electricity generation or cell voltage drop). Although falling under the prescribed condition, if it is determined that there is deterioration in the performance then the conventional fuel cell system does not perform the idle stop function (i.e., stopping the fuel cell from generating electricity) and maintains the electricity generation of the fuel cell.

SUMMARY OF THE INVENTION

One example of a fuel cell system taught herein comprises a fuel cell having a fuel electrode to which a fuel gas is supplied and an oxidant electrode to which an oxidant gas is supplied, the fuel cell configured to generate electricity via a reaction between the supplied fuel gas and the oxidant gas. A gas discharge unit is part of the fuel cell system for discharging a discharge gas from the fuel electrode of the fuel cell, and an external load exists for receiving power from the fuel cell. The fuel cell system also includes a controller unit operable to stop supply of the fuel gas and the oxidant gas if a driving power does not need to be supplied to the external load from the fuel cell, restart the supply of the fuel gas and the oxidant gas if the driving power needs to be supplied to the external load from the fuel cell after stopping the supply of the fuel gas and the oxidant gas and continue the supply of the fuel gas and the oxidant gas and discharge the discharge gas via the gas discharge unit for a predetermined time after restarting the supply of the fuel gas and the oxidant gas even if the driving power no longer needs to be supplied to the external load from the fuel cell.

Another example of an embodiment of a fuel cell system including a fuel cell and a secondary cell taught herein comprises means for stopping supply of a fuel gas and an oxidant gas to the fuel cell if a driving power does not need to be supplied to an external load from the fuel cell, means for restarting the supply of the fuel gas and the oxidant gas if the driving power needs to be supplied to the external load from the fuel cell after stopping the supply of the fuel gas and the oxidant gas and means for continuing the supply of the fuel gas and the oxidant gas to the fuel cell and for discharging a discharge gas from the fuel cell for a predetermined time after restarting the supply of the fuel gas and the oxidant gas even if the driving power no longer needs to be supplied to the external load from the fuel cell.

Methods of controlling a fuel cell system including a fuel cell and a secondary cell are also taught herein. One such method comprises stopping supply of a fuel gas and an oxidant gas to the fuel cell if a driving power does not need to be supplied to an external load from the fuel cell, restarting the supply of the fuel gas and the oxidant gas if the driving power needs to be supplied to the external load from the fuel cell after stopping the supply of the fuel gas and the oxidant gas and continuing the supply of the fuel gas and the oxidant gas to the fuel cell and discharging a discharge gas from the fuel cell for a predetermined time after restarting the supply of the fuel gas and the oxidant gas even if the driving power no longer needs to be supplied to the external load from the fuel cell.

BRIEF DESCRIPTION OF THE DRAWINGS

The description herein makes reference to the accompanying drawings wherein like reference numerals refer to like parts throughout the several views, and wherein:

FIGS. 3A and 3B illustrate an operation of calculating an idle stop prohibition time via a system control device shown in FIG. 1, wherein FIG. 3A shows an operation of calculating an initial value of the idle stop prohibition time; and FIG. 3B shows an operation of correcting the idle stop prohibition time;

DETAILED DESCRIPTION OF EMBODIMENTS OF THE INVENTION

The conventional fuel cell system previously described has a problem in that impurities (e.g., nitrogen concentration) tend to leak from an oxidant electrode side and become accumulated at a fuel electrode side during the idle stop state. The impurities are discharged according to a predetermined time interval or whenever an accumulative value of the electricity generation reaches a predetermined value. Thus, when the conventional fuel cell system reinitiates normal operations from the idle stop state, it is possible that there may be deterioration in performance.

In contrast, embodiments of the invention provide a fuel cell system capable of preventing any deterioration in performance when the system reinitiates normal operations from an idle stop state. According to one embodiment, a fuel cell system is provided in which the discharge of anode gas and the stoppage of fuel gas and oxidant gas are prohibited for a predetermined time after reinitiating the supply of fuel gas and oxidant gas from an idle stop state.

According to embodiments of the invention, impurities leaking from an oxidant electrode side and accumulated on a fuel electrode side can be discharged after the idle stop state. Further, any deterioration in the performance when reinitiating normal operations from the idle stop state can be prevented.

Details of certain embodiments of the invention are now described with reference to the accompanying drawings.

Figure 1:
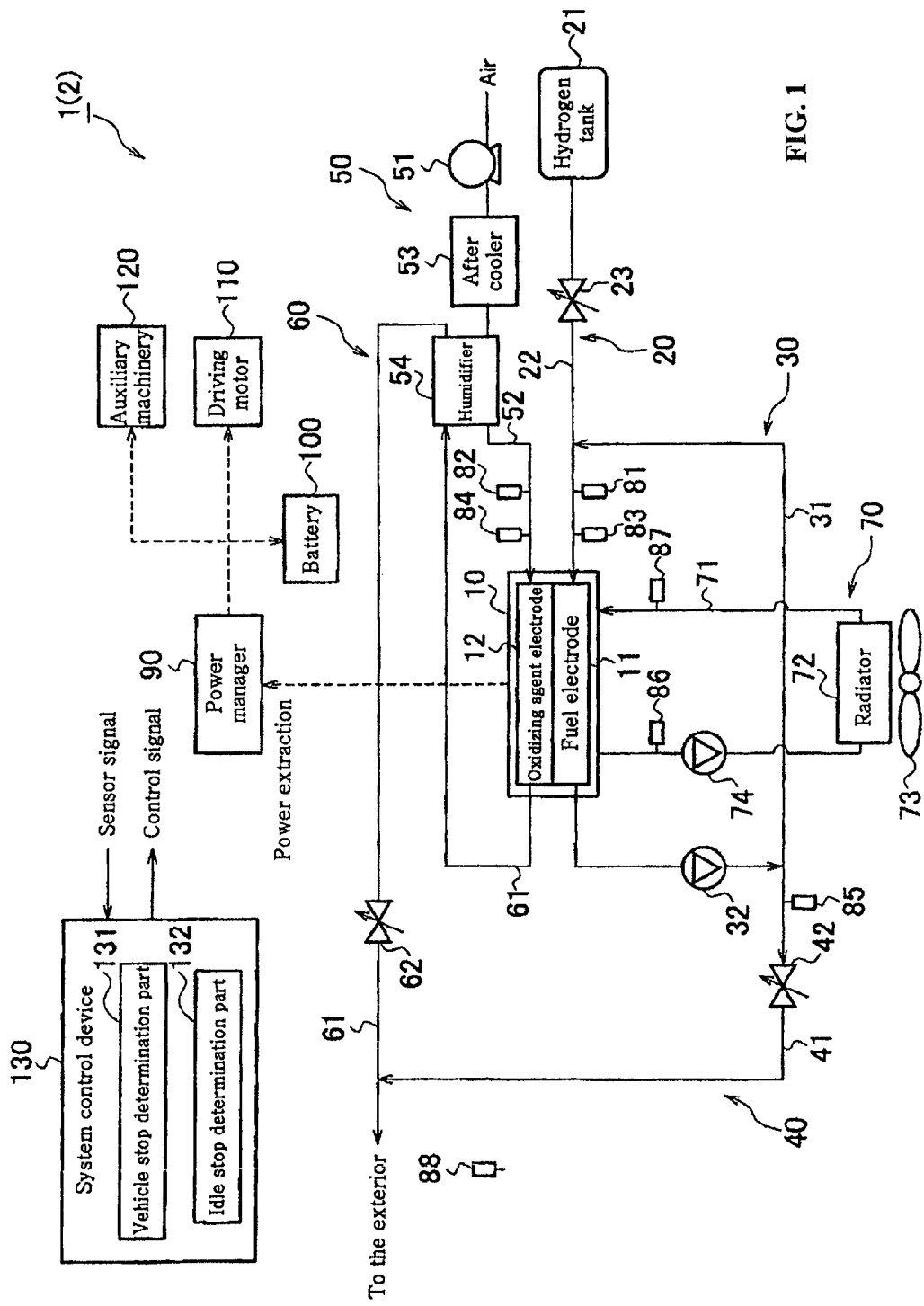
FIG. 1 illustrates a fuel cell system constructed in accordance with a first embodiment of the invention.

FIG. 1 shows a fuel cell system constructed in accordance with a first embodiment of the invention. As shown in FIG. 1, the fuel cell system 1 according to the first embodiment includes a fuel cell 10, a fuel gas supply system 20, a gas circulation unit such as gas circulation system 30, a gas discharge unit such as gas discharge system 40, an oxidant gas supply system 50, an oxidant gas discharge system 60 and a cooling liquid circulation system 70.

The fuel cell 10 includes a fuel electrode 11 to which fuel gas (e.g., hydrogen gas) is supplied. It also includes an oxidant electrode 12 to which an oxidizing agent (e.g., oxygen) (hereinafter an oxidant gas) is supplied. By possessing such electrodes 11 and 12, the fuel cell 10 can generate electricity by the reaction of the supplied fuel gas and oxidant gas. The fuel electrode 11 and the oxidant electrode 12 are overlapped while interposing an electrolyte membrane therebetween, thereby forming the electricity-generating cell 10. The fuel cell 10 includes a plurality of electricity-generating cells, which are arranged in multi-layers in a stack structure.

The fuel gas supply system 20 includes a hydrogen tank 21, a hydrogen gas inlet pipe 22 and a pressure control valve 23. The hydrogen tank 21 accumulates hydrogen gas, which is supplied to the fuel electrode 11 of the fuel cell 10. The hydrogen gas inlet pipe 22 connects the hydrogen tank 21 and an inlet of the fuel electrode side of the fuel cell 10 so as to guide the hydrogen gas to the fuel electrode 11 of the fuel cell 10 from the hydrogen tank 21. The pressure control valve 23 is mounted to the hydrogen gas inlet pipe 22 to adjust the degree of opening, thereby controlling the amount of hydrogen gas supplied to the fuel electrode side of the fuel cell 10. Also, the pressure control valve 23 can control the pressure of the fuel electrode side of the fuel cell 10 by regulating the supply amount of hydrogen gas.

The gas circulation system 30 circulates gas discharged from the fuel electrode side of the fuel cell 10. Then, the gas circulation system 30 once again guides the gas back to the fuel electrode side of the fuel cell 10. This is so that the discharged fuel gas is not reused for generating electricity. The gas circulation system 30 includes a circulation pipe 31 and a gas circulation device 32. One end of the circulation pipe 31 is connected to an outlet of the fuel electrode side of the fuel cell 10. The other end of the circulation pipe 31 is connected to the hydrogen gas inlet pipe 22 between the pressure control valve 23 and the inlet of the fuel electrode side of the fuel cell 10. By such connections, the off-gas discharged from the fuel electrode side of the fuel cell 10 is circulated and guided back again to the fuel electrode side of the fuel cell 10 through the circulation pipe 31. The gas circulation device 32 is mounted to the circulation pipe 31. The gas circulation device 32 functions as a power source for circulating the gas discharged from the fuel electrode side of the fuel cell 10 and guiding the gas back to the fuel electrode side of the fuel cell 10.

The gas discharge system 40 connects a section of the circulation pipe 31, through which the gas circulating via the gas circulation device 32 reaches the fuel cell 10, with the exterior. The gas discharge system 40 discharges gas from the fuel electrode side of the fuel cell 10 to the exterior. The gas discharge system 40 includes a gas discharge pipe 41 forming a gas discharge flow path and a purge, or control, valve 42. One end of the gas discharge pipe 41 is connected to the circulation pipe 31 from the gas circulation device 32 to the fuel cell 10, while the other end of the gas discharge pipe 41 is connected to the exterior. By such connections, the gas from the fuel electrode side of the fuel cell 10 can be effectively discharged. The purge valve 42 is mounted to the gas discharge pipe 41 to adjust the degree of opening of the gas discharge pipe 41 to control the discharge amount of gas.

Next, operation of the purge valve 42 is described. According to a partial pressure difference between the oxidant electrode side and the fuel electrode side as well as a temperature of electrolyte membrane constituting the fuel cell 10, the gas (e.g., nitrogen) existing at the oxidant electrode side, which is not used for generating electricity of the fuel cell 10, is transmitted to the fuel electrode side from the oxidant electrode side through the electrolyte membrane. The gas circulation device 32 has a maximum circulation rate value, which can be derived based on a gas circulation performance of the gas circulation device 32, a pressure loss of the fuel cell 10 and a pressure loss of the circulation pipe 31. However, if nitrogen is transmitted to the fuel electrode side, then the maximum circulation rate value decreases. Therefore, it is possible that the circulation rate according to the electricity generation of the fuel cell 10 cannot be achieved. To solve this problem, the decrease in the circulation rate of the gas circulation device 32 is prevented by adjusting the degree of opening for the purge valve 42 and discharging nitrogen from the fuel electrode side to the exterior.

The oxidant gas supply system 50 includes a compressor 51, an air supply pipe 52, an after cooler 53 and a humidifier 54. The compressor 51 compresses air, which is to be moved to the oxidant electrode 12 of the fuel cell 10. The air supply pipe 52 connects the compressor 51 and the inlet of the oxidant electrode side of the fuel cell 10. As such, the air supply pipe 52 guides the compressed air from the compressor 51 to the oxidant electrode side of the fuel cell 10. The after cooler 53 is mounted to the air supply pipe 52 between the compressor 51 and the inlet of the oxidant electrode side of the fuel cell 10. The after cooler 53 is configured to cool down the compressed air from the compressor 51 to a temperature adequate for the reaction at the fuel cell 10. The humidifier 54 is mounted to the air supply pipe 52 between the after cooler 53 and the inlet of the oxidant electrode side of the fuel cell 10. The humidifier 54 functions to humidify the cool, compressed air supplied to the fuel cell 10 to maintain the electrolyte membrane of the fuel cell 10 in a humid condition.

The oxidant gas discharge system 60 includes an oxidant gas discharge pipe 61 and a second pressure control valve 62. The oxidant gas discharge pipe 61 connects the oxidant electrode side of the fuel cell 10 and the exterior. By this connection, the oxidant gas discharge pipe 61 can guide the gas flowing out of the oxidant electrode side to the exterior. The second pressure control valve 62 is mounted to the oxidant gas discharge pipe 61 to control the amount of gas discharged from the oxidant electrode side. Also, the humidifier 54 is disposed on the oxidant gas discharge pipe 61. Accordingly, the off-gas flowing out of the oxidant electrode side is discharged to the exterior via the humidifier 54. Here, moisture contained in the off-gas, which is from the oxidant electrode side, is used in the humidification by the humidifier 54 of the air from the compressor 51 and the after cooler 53.

The cooling liquid circulation system 70 is used for adjusting the temperature of the fuel cell 10 so as to prevent any excessive rise in the temperature of the fuel cell 10. The cooling liquid circulation system 70 includes a cooling liquid circulation pipe 71, a radiator 72, a radiator fan 73 and a pump 74. The cooling liquid circulation pipe 71 is a flow path for circulating the cooling liquid in the cooling liquid circulation system 70. The cooling liquid sequentially passes through the fuel cell 10, the pump 74 and the radiator 72 and then back again into the fuel cell 10. The radiator 72 is used for cooling down the cooling liquid. The radiator fan 73 blows air toward the radiator 72 so as to promote cooling of the cooling liquid. The pump 74 is a source for circulating the cooling liquid in the cooling liquid circulation system 70.

The fuel cell system 1 according to the first embodiment further includes a plurality of sensors 81 to 88, a power manager 90, a battery 100 (also called an auxiliary power source), a driving motor 110 and auxiliary machinery 120 as external loads and a system control device 130.

Among the sensors 81 to 88, a first pressure sensor 81 is mounted to the hydrogen gas inlet pipe 22 between the pressure control valve 23 and the inlet of the fuel electrode side of the fuel cell 10. The first pressure sensor 81 detects the pressure of the fuel electrode side of the fuel cell 10. A second pressure sensor 82 is mounted to the air supply pipe 52 between the humidifier 54 and the inlet of the oxidant electrode side of the fuel cell 10. The second pressure sensor 82 detects the pressure of the oxidant electrode side of the fuel cell 10.

A first temperature sensor 83 is mounted to the hydrogen gas inlet pipe 22 between the pressure control valve 23 and the inlet of the fuel electrode side of the fuel cell 10. The first temperature sensor 83 detects the temperature of the gas flowing to the fuel electrode side of the fuel cell 10. A second temperature sensor 84 is mounted to the air supply pipe 52 between the humidifier 54 and the inlet of the fuel electrode side of the fuel cell 10. The second temperature sensor 84 detects the temperature of the gas flowing to the oxidant electrode side of the fuel cell 10.

A third temperature sensor 85 is mounted to the gas discharge pipe 41 and detects the temperature of the gas discharged from the fuel electrode side of the fuel cell 10.

A fourth temperature sensor 86 is mounted to a section of the cooling liquid circulation pipe 71 through which the cooling water flowing out of the fuel cell 10 reaches the pump 74. The fourth temperature sensor 86 detects the temperature of the cooling water warmed by cooling the fuel cell 10. A fifth temperature sensor 87 is mounted to a section of the cooling liquid circulation pipe 71 through which the cooling water flowing out of the radiator 72 reaches the fuel cell 10. The fifth temperature sensor 87 detects the temperature of the cooling water to be moved to the fuel cell 10 to cool down the fuel cell 10.

An atmospheric pressure sensor 88 detects the atmospheric pressure around the fuel cell system 1.

The power manager 90 extracts power from the fuel cell 10 and supplies the power to the battery 100 or the driving motor 110. In order to control the power extraction, the power manager 90 functions to detect a current or voltage of each cell of the fuel cell 10 so as to determine a total current or voltage of the fuel cell 10.

The battery 100 is used for supplying the power to the driving motor 110 in order to compensate for power not supplied to the driving motor 110 from the fuel cell 10. Also, the battery 100 supplies the power necessary to drive the auxiliary machinery 120, which is required to generate the electricity in the fuel cell system 1. Finally, the battery 100 accumulates any surplus power generated at the fuel cell 10 as well as any regenerative power of the driving motor 110.

The driving motor 110 receives power from the fuel cell 10 or the battery 100 in order to generate a driving force. The auxiliary machinery 120 includes generally the hydrogen tank 21, the pressure control valve 23, the gas circulation device 32, the compressor 51 and the pump 74, which operate by receiving power from the fuel cell 10 or the battery 100.

The system control device 130 is used for controlling the operational states (various valves, gas supply and discharge, power extraction and the like) of the fuel cell system 1. The system control device 130 receives information regarding a residual capacity of the battery 100, power consumed by the driving motor 110, power to be supplied by the battery 100, current and voltage for each cell of the fuel cell 10, a total current and voltage of the fuel cell 10 and values detected by the sensors 81 to 88. Based on the above inputted information, the system control device 130 outputs control signals for controlling the valves 23, 42 and 62, the compressor 51 and the radiator fan 73.

The system control device, or controller unit, 130 generally consists of a microcomputer including central processing unit (CPU), input and output ports (I/O), random access memory (RAM), keep alive memory (KAM), a common data bus and read only memory (ROM) as an electronic storage medium for executable programs and certain stored values as discussed hereinafter. The various parts of the system control device 130 described herein for receiving the inputted information and outputting control signals could be, for example, implemented in software as the executable programs, or could be implemented in whole or in part by separate hardware in the form of one or more integrated circuits (IC).

The system control device 130 is configured to convert a normal electricity generation mode (wherein power is supplied to the loads such as the driving motor 110 only by the fuel cell 10 or by both the fuel cell 10 and the battery 100) into an idle stop mode (wherein power is supplied to the loads only by the battery 100), and vice-versa. If the prescribed conditions where power required for the fuel cell system is less than a predetermined value as discussed in detail below are satisfied, then the system control device 130 controls the system to operate in the idle stop mode. This is so that the electricity generation by the fuel cell 10 is stopped, and the power is supplied to the loads only from the battery 100.

The system control device 130 includes a vehicle stop determination part 131 and an idle stop determination part 132. The vehicle stop determination part 131 determines whether or not the vehicle is stopped. If (1) a value detected by a car speed sensor is less than a predetermined value, (2) the expected power consumption of the driving motor 110 is less than a predetermined value and (3) a residual capacity of the battery 100 is more than a predetermined value, then the vehicle stop determination part 131 concludes that the vehicle is stopped. In other words, the vehicle stop determination part 131 concludes that the vehicle is in a state wherein the power required for the system can be supplemented only by the battery 100. On the other hand, if any of the conditions are not met the vehicle stop determination part 131 concludes that the vehicle is not stopped.

If the vehicle stop determination part 131 concludes that the vehicle is stopped, then the idle stop determination part 132 determines whether or not it is preferable that the system performs the idle stop mode in which the electricity generation by the fuel cell 10 is stopped. If (1) a value detected by the first pressure sensor 81 is less than a predetermined value, (2) a value detected by the first temperature sensor 83 is less than a predetermined value and (3) a minimum voltage among the voltages of the respective cells of the fuel cell 10 is in a predetermined range, then the idle stop determination part 132 concludes that it is preferable to perform the idle stop mode. On the other hand, if any one of the above three conditions is not satisfied then the idle stop determination part 132 concludes that the idle stop mode should not be performed.

Next, a control operation of the fuel cell system 1 in the idle stop mode is described. In the idle stop mode, the system control device 130 stops the operation of the compressor 51 as well as the electricity generation by the fuel cell 10. Also, the system control device 130 completely closes the pressure control valve 23, the purge valve 42 and the second pressure control valve 62. Accordingly, the fuel cell system 1 can restrict the power consumption of the auxiliary machinery 120 and the hydrogen consumption while increasing the fuel efficiency. In the idle stop mode, since the pressure control valve 23, the purge valve 42 and the second pressure control valve 62 are completely closed and the operation of the compressor 51 is stopped, the fuel cell 10 is in a sealed state. Therefore, if the fuel cell system 1 is maintained in the idle stop mode for a long time, then nitrogen at the oxidant electrode side cross leaks to the fuel electrode side. In such a case, the nitrogen concentration at the fuel electrode side is increased. Also, if the nitrogen concentration is excessively increased when the electricity generation is restarted then the desired electricity generation by the fuel cell 10 cannot be achieved.

In this embodiment, the system control device 130 calculates the idle stop prohibition time. As such, the system control device 130 can prohibit the idle stop mode from being performed until the idle stop prohibition time elapses after the electricity generation is reinitiated. Also, the system control device 130 discharges the gas from the fuel electrode side until the idle stop prohibition time elapses.

More specifically, when the above three conditions are satisfied, the electricity generation by the fuel cell 10 is stopped. Then, the electricity generation by the fuel cell 10 is reinitiated. Although the above three conditions are met for the idle stop prohibition time after reinitiating the electricity generation, the system control device 130 does not stop the electricity generation by the fuel cell 10. Likewise, at least for the idle stop prohibition time after reinitiating the electricity generation, the system does not go into the idle stop state. The normal operation mode and the idle stop mode are prevented from repeating right after reinitiating the electricity generation to thereby cause discomfort to a system user.

Also, the system control device 130 discharges the gas via the gas discharge system 40 for the idle stop prohibition time. Accordingly, the nitrogen, which cross leaks from the oxidant electrode side and accumulates at the fuel electrode side in the idle stop state, can be discharged. Thus, the nitrogen concentration at the fuel electrode side can be decreased. If the nitrogen concentration is decreased when the system once again goes into the idle stop state, then the nitrogen concentration becomes low. Although the fuel cell system cancels the idle stop state when the nitrogen concentration reaches a predetermined value, the idle stop state is not released immediately. As such, the fuel efficiency is increased.

Figure 2:
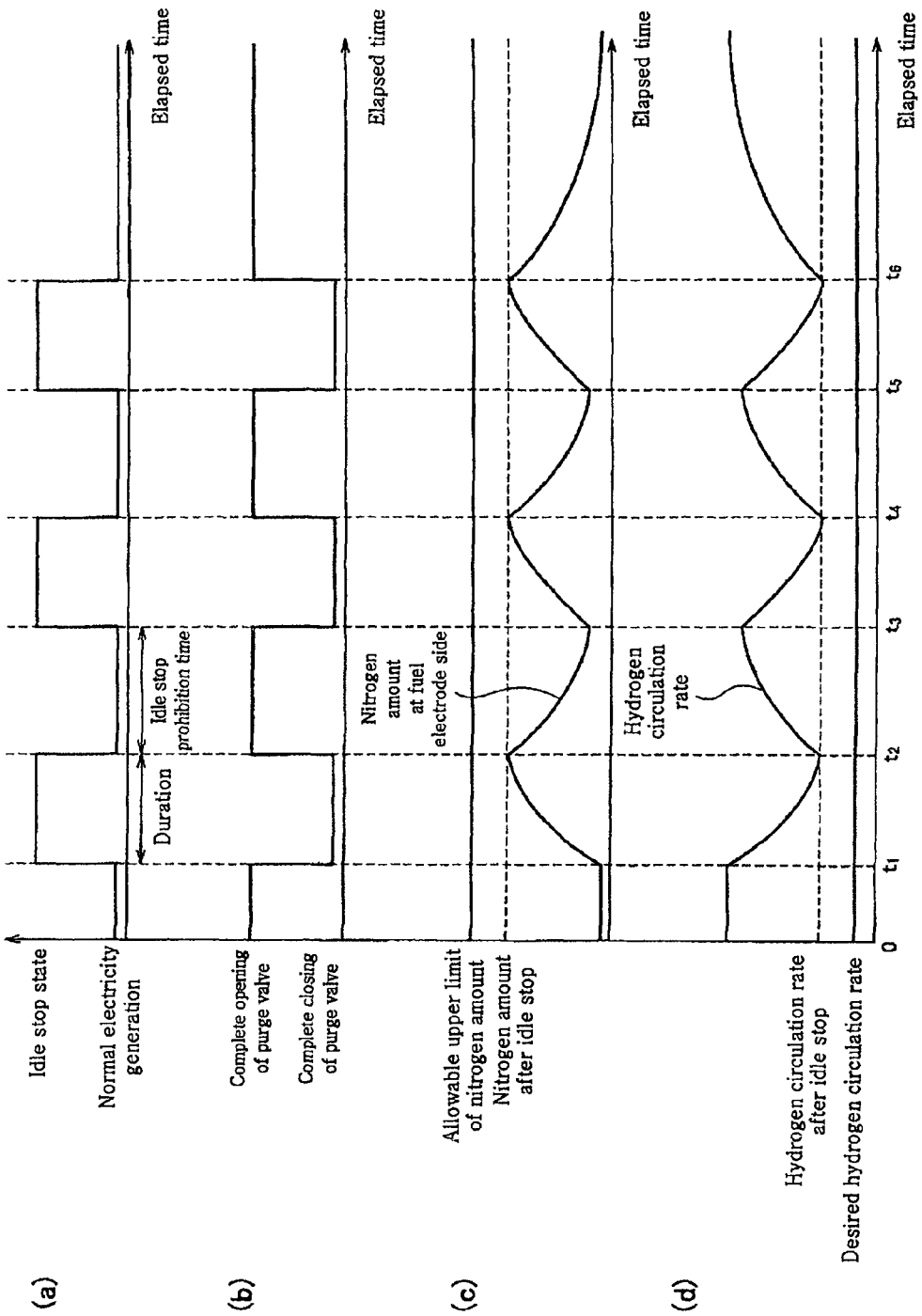
FIG. 2 illustrates a time chart showing an operation of the fuel cell system shown in FIG. 1, wherein: (a) shows a state of the fuel cell system; (b) shows a degree of opening for a purge valve; (c) shows an amount of nitrogen at a fuel electrode side; and (d) shows a circulation rate of hydrogen circulating via a gas circulation system.

Next, an operation of the fuel cell system 1 according to the first embodiment is described. FIG. 2 is a time chart showing the operation of the fuel cell system 1 in accordance with the first embodiment. In FIG. 2, (a) shows the state of the fuel cell system 1; (b) shows the degree of opening for the purge valve 42; (c) shows the amount of nitrogen at the fuel electrode side; and (d) shows the circulation rate of hydrogen circulating via the gas circulation system 30.

As shown in (a), if the three conditions are satisfied at time t1 and the idle stop determination part 132 concludes that it is preferable to perform the idle stop mode, then the fuel cell system 1 goes into the idle stop state. At this time, as shown (b), the system control device 130 completely closes the purge valve 42. Also, the system control device 130 stops the operation of the compressor 51. At the same time, the system control device 130 completely closes the pressure control valve 23 and the second pressure control valve 62. Thus, from time t1 to time t2, air at the oxidant electrode side cross leaks to the fuel electrode side, and the amount of nitrogen at the fuel electrode side is thus increased (see (c)). Also, since oxygen contained in air having cross leaked from the oxidant electrode side reacts with hydrogen at the fuel electrode side so as to form water, the amount of hydrogen at the fuel electrode side is decreased. Thus, from time t1 to time t2, the circulation rate of hydrogen at the fuel electrode side is decreased (see (d)). An "allowable upper limit of nitrogen amount" in (c) refers to a value in which the nitrogen amount at the fuel electrode side does not exceed so as to normally perform electricity generation at the fuel cell 10. A "desired hydrogen circulation rate" in (d) refers to a minimum value of the circulation rate that is required to maintain electricity generation at the fuel cell 10.

At time t2, if the desired amount of electricity generation is increased (e.g., by stepping on an accelerator pedal), then the fuel cell system 1 converts the idle stop mode into the normal electricity generation mode as shown in (a). At this time, as shown in (b), the system control device 130 completely opens the purge valve 42. The purge valve 42 is retained in a completely opened state until the idle stop prohibition time elapses. Also, in order to perform the electricity generation according to the requirements from the vehicle, the system control device 130 controls the compressor 51. When performing the normal electricity generation mode, the idle stop prohibition time starts to be counted, and the purge valve 42 is completely opened for the idle stop prohibition time. Thus, from time t2 to time t3, the amount of nitrogen at the fuel electrode side is decreased (see (c)). Also, the circulation rate of hydrogen at the fuel electrode side is increased in accordance with the decrease in the amount of nitrogen (see (d)).

Particularly, although the above three conditions are satisfied for the idle stop prohibition time in this embodiment, the system control device 130 does not perform the idle stop mode. Accordingly, the mode change is not conducted at least for the idle stop prohibition time. Thus, the mode change can be prevented from frequently occurring so as to minimize discomfort to a system user. In order to discharge the gas at the fuel electrode side for the idle stop prohibition time, nitrogen accumulated at the fuel electrode side in the idle stop state from time t1 to time t2 can be discharged from time t2 to time t3. As such, the nitrogen concentration at the fuel electrode side can be decreased. Further, the nitrogen concentration should be low in order to discharge nitrogen for the idle stop prohibition time when the idle stop mode is performed once again at time t3. Also, although the fuel cell system may cancel the idle stop state when the nitrogen concentration reaches a predetermined value, the idle stop state is not stopped immediately, thereby increasing the fuel efficiency.

The operational state after time t3 is repeated in the same manner as those for time t1 and t3. The idle stop prohibition time is calculated by the system control device 130. The system control device 130 shortens the idle stop prohibition time as the duration, which is from stopping and restarting the electricity generation by the fuel cell 10 (e.g., from time t1 to time t2), is shortened. If the duration is shortened, then the amount of nitrogen cross leaking from the oxidant electrode side to the fuel electrode side is small. Thus, although the idle stop prohibition time in which the gas is discharged is shortened, nitrogen can be sufficiently discharged.

As the flow rate of the gas discharged by the gas discharge system 40 is increased, the system control device 130 shortens the idle stop prohibition time. If the flow rate of the discharged gas is increased, then a large amount of nitrogen cross leaking from the oxidant electrode side in the idle stop state is discharged.

Figure 3A:
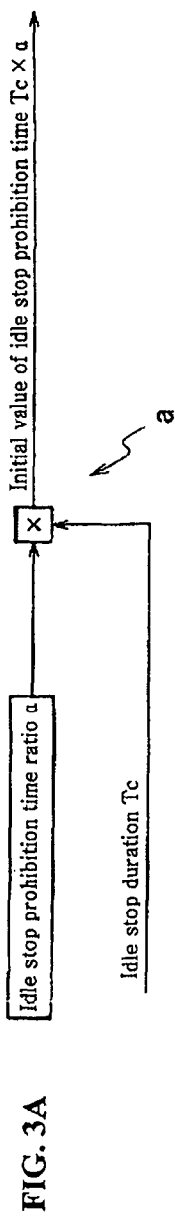
Figure 3B:
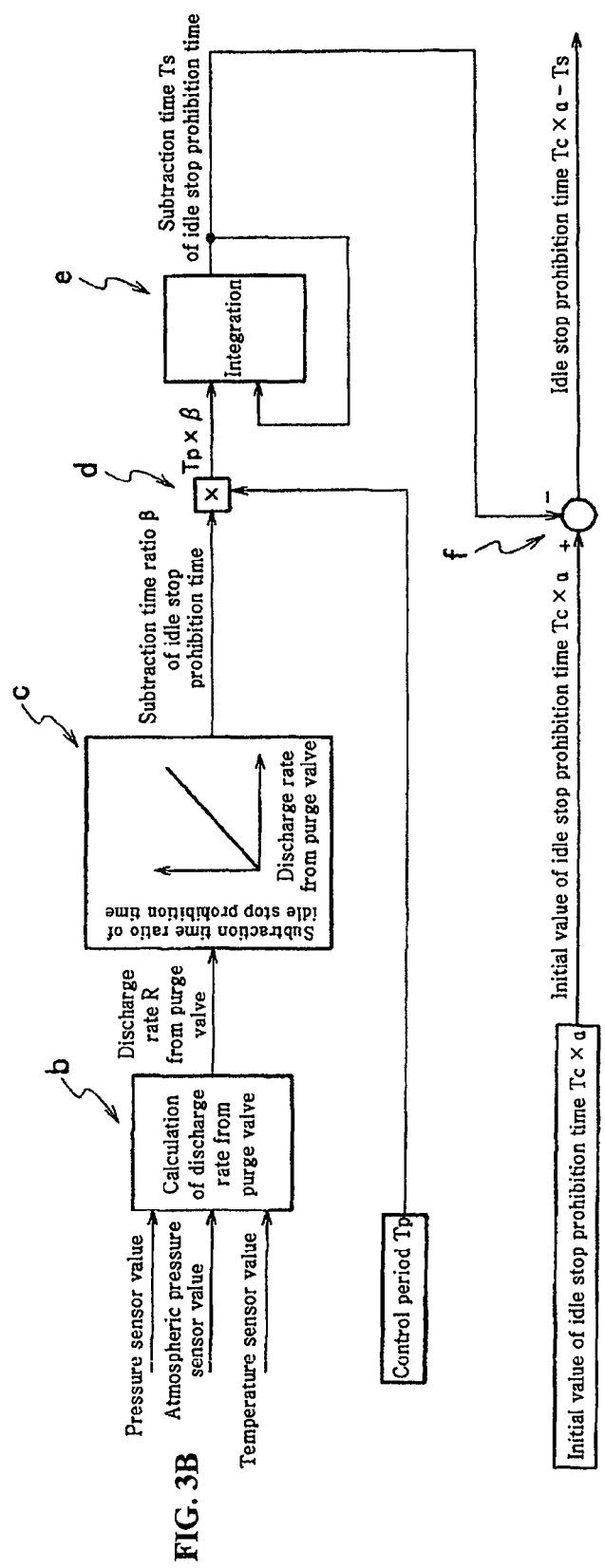

Particularly, the system control device 130 calculates the idle stop prohibition time as shown in FIGS. 3A and 3B, which show the operation of calculating the idle stop prohibition time using the system control device 130 depicted in FIG. 1. Here, the calculation of the idle stop prohibition time includes calculating an initial value of the idle stop prohibition time and correcting the idle stop prohibition time. FIG. 3A shows the operation of calculating the initial value of the idle stop prohibition time whereas FIG. 3B shows the operation of correcting the idle stop prohibition time.

As shown in FIG. 3A, the system control device 130 stores an idle stop prohibition time ratio α. When the idle stop time is continued for constant time Tc, the time ratio α serves as a coefficient for evaluating the time in which the amount of nitrogen accumulated at the fuel electrode side for constant time Tc can be discharged by completely opening the purge valve 42. Accordingly, the initial value of the idle stop prohibition time when the idle stop time is continued for constant time Tc becomes the value Tc×α with reference to reference character a. By completely opening the purge valve 42 only for time Tc×α, the amount of nitrogen accumulated at the fuel electrode side for constant time Tc can be discharged. The initial value of the idle stop prohibition time is corrected later. In addition, the initial value is a reference for the idle stop prohibition time. Therefore, as the duration is shortened, the system control device 130 shortens the idle stop prohibition time.

As shown in FIG. 3B, the system control device 130 corrects the initial value of the idle stop prohibition time. In other words, the system control device 130 evaluates a subtraction time of the idle stop prohibition time and subtracts the subtraction time from the initial value of the idle stop prohibition time with reference to reference character f. By doing so, the initial value of the idle stop prohibition time can be corrected while the idle stop prohibition time may be readily evaluated.

More specifically, the system control device 130 receives information in relation to a pressure detected by the first pressure sensor 81, an atmospheric pressure detected by the atmospheric pressure sensor 88 and a temperature detected by the first temperature sensor 83. In other words, by inputting the pressure information of the first pressure sensor 81, the pressure information of an upper stream of the purge valve 42 is inputted to the system control device 130. By inputting the atmospheric pressure information of the atmospheric pressure sensor 88, the pressure information of a lower stream of the purge valve 42 is inputted to the system control device 130. Also, by inputting the temperature information of the first temperature sensor 83, the temperature information of the fuel gas is inputted to the system control device 130.

Further, the system control device 130 calculates the discharge flow rate R of the gas discharged through the purge valve 42 per unit time (with reference to reference character b) based on the pressures of the upper and lower streams of the purge valve 42 as well as the temperature of the fuel gas. Here, the system control device 130 stores a relationship map referred to with reference character c showing the relationship between the discharge flow rate R from the purge valve 42 and the subtraction time ratio β of the idle stop prohibition time. The subtraction time ratio β of the idle stop prohibition time is a coefficient for evaluating the subtraction time of the idle stop prohibition time based on the discharge flow rate from the purge valve 42. When evaluating the discharge flow rate R from the purge valve 42, the system control device 130 evaluates the subtraction time ratio β of the idle stop prohibition time based on the relationship map.

Then, with reference to reference character d, the system control device 130 multiplies a control period Tp by the subtraction time ratio β of the idle stop prohibition time, which is evaluated from the relationship map. The system control device 130 integrates the evaluated time Tp×β with reference to reference character e and outputs the time evaluated by the integration during a predetermined period as the subtraction time Ts of the idle stop prohibition time. Thereafter, the system control device 130 subtracts the subtraction time Ts of the idle stop prohibition time from the initial value Tc×α of the idle stop prohibition time as previously mentioned, thereby acquiring the idle stop prohibition time Tc×α−Ts.

As apparent from FIG. 3B, the system control device 130 corrects the idle stop prohibition time by subtracting the subtracting time Ts of the idle stop prohibition time from the initial value Tc×α of the idle stop prohibition time. Such a correction is performed based on the pressure of the upper stream of the purge valve 42, the pressure of the lower stream of the purge valve 42 and the temperature of the fuel gas. If the pressure of the upper stream of the purge valve 42 is high, then the flow rate of the gas discharged through the purge valve 42 is increased. If the pressure of the lower stream of the purge valve 42 is high, then the flow rate of the discharge gas is decreased. If the temperature of the gas is high, then the flow rate of the discharge gas is decreased. Likewise, the system control device 130 can evaluate an accurate idle stop prohibition time by performing the correction based on the pressure of the upper stream of the purge valve 42, the pressure of the lower stream of the purge valve 42 and the temperature of the fuel gas.

The system control device 130 is not restricted to performing the correction based on the above three parameters, i.e., the pressure of the upper stream of the purge valve 42, the pressure of the lower stream of the purge valve 42 and the temperature of the fuel gas. The system control device 130 may perform the correction based on one or more of the three parameters. Also, although the system control device 130 corrects the idle stop prohibition time based on the pressure of the upper stream of the purge valve 42, the pressure of the lower stream of the purge valve 42 and the temperature of the fuel gas, it is certainly not limited thereto. The system control device 130 may be configured to perform the correction based on either the pressure of the oxidant electrode side (e.g., a value detected by the second pressure sensor 82) or the temperature of the main body of the fuel cell 10 (e.g., values detected by the fourth and fifth temperature sensors 86 and 87). The amount of nitrogen cross leaking from the oxidant electrode side to the fuel electrode side is influenced by the pressure of the oxidant electrode side and the temperature of the main body of the fuel cell 10 (e.g., the temperature of the electrolyte membrane). Particularly, if the pressure of the oxidant electrode side is high, then there is an increase in the amount of nitrogen cross leaking. Also, if the temperature of the electrolyte membrane is high, then the amount of nitrogen cross leaking is increased. In other words, by correcting the idle stop prohibition time based on either the pressure of the oxidant electrode side or the temperature of the electrolyte membrane, the idle stop prohibition time can be accurately evaluated.

Figure 4:
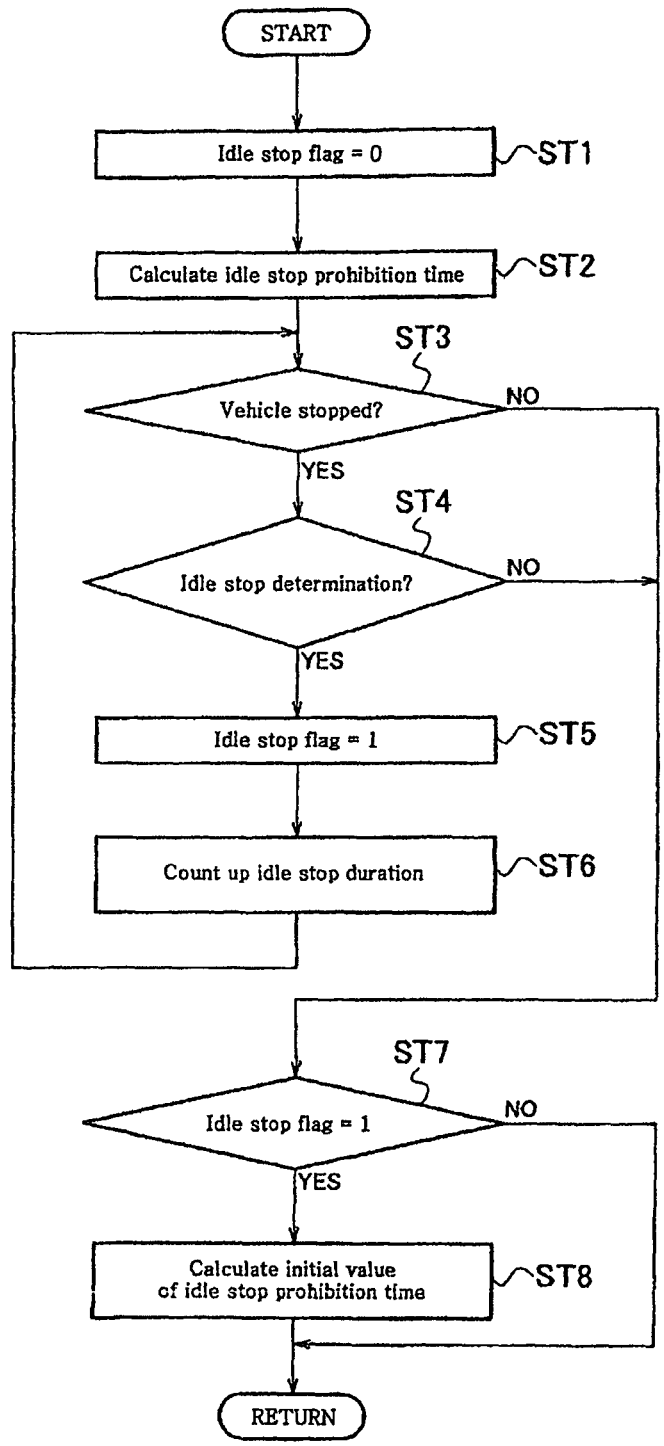
FIG. 4 is a flow chart illustrating an operation of the fuel cell system shown in FIG. 1.

FIG. 4 is a flow chart showing the operation of the fuel cell system 1, which is in accordance with the first embodiment of the invention. As shown in FIG. 4, the system control device 130 substitutes "0" for an idle stop flag at step ST1. The idle stop flag indicates whether or not the idle stop mode is performed at the present moment. In other words, when the idle stop flag is "1," this means that the fuel cell system 1 is performing the idle stop mode. However, when the idle stop flag is "0," this means that the fuel cell system 1 is performing the normal electricity generation mode.

The system control device 130 calculates the idle stop prohibition time at step ST2. At this time, the system control device 130 evaluates the idle stop prohibition time by the process illustrated in FIG. 3B. When reinitiating electricity generation by converting the idle stop mode into the normal electricity generation mode at the time of step ST2, the system control device 130 completely opens the purge valve 42 at step ST2 and retains the purge valve 42 in a completely opened state until the idle stop prohibition time becomes "0." As such, nitrogen accumulated at the fuel electrode side in the idle stop state is discharged to the outside as much as possible. If the idle stop prohibition time becomes "0" then the system control device 130 controls the degree of opening for the purge valve 42. This occurs so that the purge valve 42 is opened to an extent required for implementing the normal electricity generation. In other words, the system control device 130 forms the degree of opening for the purge valve 42 in the idle stop prohibition time to be larger than the degree of opening for the purge valve 42 after the idle stop prohibition time elapses.

Next, the vehicle stop determination part 131 of the system control device 130 determines whether or not the vehicle is stopped at step ST3. If the vehicle is not stopped (that is, the response to the query of ST3 is NO), then the process proceeds to step ST7. However, if the vehicle is stopped (that is, the response to the query of ST3 is YES), then the idle stop determination part 132 determines whether or not the three conditions are satisfied and whether it is preferable to perform the idle stop mode at step ST4.

If the three conditions are not satisfied and the idle stop mode should not be performed as the answer to the query of ST4 is NO, then the process proceeds to step ST7. However, if the three conditions are satisfied and it is preferable to perform the idle stop mode as the answer to the query of ST4 is YES, then the system control device 130 substitutes "1" for the idle stop flag at step ST5. The system control device 130 prohibits performance of the idle stop mode until the idle stop prohibition time elapses after reinitiating the electricity generation. Accordingly, although there is a "YES" in response to step ST4, the system control device 130 prohibits performance of the idle stop mode so long as the idle stop prohibition time does not elapse. The process then proceeds to step ST7. If the system control device 130 performs the idle stop mode at step ST5, then the system control device 130 completely closes the purge valve 42 and stops the operation of the compressor 51.

After substituting "1" for the idle stop flag at step ST5, the system control device 130 assesses the duration after the conversion into the idle stop state at step ST6. As such, the duration in the idle stop state is evaluated and used for calculating the initial value of the idle stop prohibition time. Then, the process returns to step ST3.

Also, the system control device 130 stores the maximum value of the duration. If the duration exceeds the maximum value, then the fuel cell system 1 can be controlled to convert the idle stop mode into the normal electricity generation mode. As a result, nitrogen is prevented from gathering excessively at the fuel electrode side.

The system control device 130 determines whether or not the idle stop flag is "1" at step ST7. If the idle stop flag is "1" (that is, the response to the query of ST7 is YES), and since the duration is assessed at step ST6, then the system control device 130 evaluates the initial value of the idle stop prohibition time at step ST8 so as to calculate the next idle stop prohibition time. At this time, the system control device 130 evaluates the initial value of the idle stop prohibition time via the process illustrated in FIG. 3A. Then, the process returns to step ST1. However, if it is determined that the idle stop flag is not "1" (that is, the response to the query of ST7 is NO), then the system control device 130 does not evaluate the initial value of the idle stop prohibition time. The process then proceeds to step ST1.

When the system is in the idle stop state due to satisfying the prescribed conditions and then cancels the idle stop by the fuel cell, the system does not perform the idle stop mode although the prescribed conditions are met for a predetermined time after canceling the idle stop. Also, the gas is discharged by the gas discharge means for the predetermined time. Accordingly, impurities cross leaking from the oxidant electrode side and accumulated at the fuel electrode side in the idle stop state can be discharged. Thus, any deterioration in the performance when reinitiating the normal operation from the idle stop state can be prevented. The predetermined time can be set to be the time for the amount of impurities to be substituted by the amount of hydrogen required for performing the normal operation by discharging the gas, e.g., by the gas discharge means.

When the system stops the electricity generation by the fuel cell 10 through satisfying the three prescribed conditions and then reinitiates the electricity generation by the fuel cell 10, the system does not stop the electricity generation by the fuel cell 10 although the above conditions are met in the idle stop prohibition time after reinitiating the electricity generation. Likewise, at least for the idle stop prohibition time after reinitiating the electricity generation, the system does not go into the idle stop state. Thus, the normal operation mode and the idle stop mode may be prevented from repeating during the idle stop prohibition time, which can cause discomfort to the system user.

Also, since the gas is discharged by the gas discharge system 40 for the idle stop prohibition time, nitrogen cross leaking from the oxidant electrode side and accumulated at the fuel electrode side in the idle stop state can be discharged. Thus, the nitrogen concentration at the fuel electrode side can be decreased. Then, when the system once again goes into the idle stop state, then the nitrogen concentration is low. Although the fuel cell system cancels the idle stop state when the nitrogen concentration reaches a predetermined value, the idle stop state is not stopped immediately.

Accordingly, any discomfort to the system user can be decreased. Further, the fuel efficiency can be increased.

As the duration (i.e., from stopping to reinitiating the electricity generation by the fuel cell 10) is shortened, the idle stop prohibition time can be shortened. If the duration is shortened, then the idle stop prohibition time in which the gas is discharged can be shortened since the amount of nitrogen cross leaking from the oxidant electrode side to the fuel electrode side is quite small. Thus, while the idle stop prohibition time is shortened, any discomfort to the system user can be reduced, and the fuel efficiency may be increased.

As the flow rate of the gas discharged by the gas discharge system 40 is increased, the idle stop prohibition time is set to be shortened. If the flow rate of the discharged gas is increased, then the idle stop prohibition time can be shortened since a large amount of nitrogen cross leaking from the oxidant electrode side in the idle stop state is discharged. Thus, while the idle stop prohibition time is shortened, any discomfort to the system user can be reduced, and the fuel efficiency may be increased.

Also, the degree of opening for the purge valve 42 in the idle stop prohibition time is larger than the degree of opening for the purge valve 42 after the idle stop prohibition time elapses. As a result, the gas discharge amount in the idle stop prohibition time is higher than the gas discharge amount in the normal electricity generation after the idle stop prohibition time elapses. Accordingly, a large amount of nitrogen is discharged in the idle stop prohibition time, which can be shortened.

The idle stop prohibition time is corrected based on the pressure of the upper stream of the purge valve 42, the pressure of the lower stream of the purge valve 42 and/or the temperature of the fuel gas. The gas discharge amount is influenced by the pressure of the upper stream of the purge valve 42, the pressure of the lower stream of the purge valve 42 and the temperature of the fuel gas. As a result, by correcting the idle stop prohibition time based on at least one of these parameters, the idle stop prohibition time can be accurately evaluated.

The idle stop prohibition time is also corrected based on either the pressure of the oxidant electrode side of the fuel cell 10 or the temperature of the main body of the fuel cell 10. The amount of nitrogen cross leaking from the oxidant electrode side to the fuel electrode side is influenced by the pressure of the oxidant electrode side and the temperature of the main body of the fuel cell 10 (e.g., temperature of the electrolyte membrane). As a result, by correcting the idle stop prohibition time based on at least one of these parameters, the idle stop prohibition time can be accurately evaluated.

Next, a fuel cell system in accordance with a second embodiment of the invention is described. The components of a fuel cell system 2 according to the second embodiment can be identical to that of the fuel cell system according to the first embodiment. However, the respective operational processes are different, as discussed below.

Figure 5:
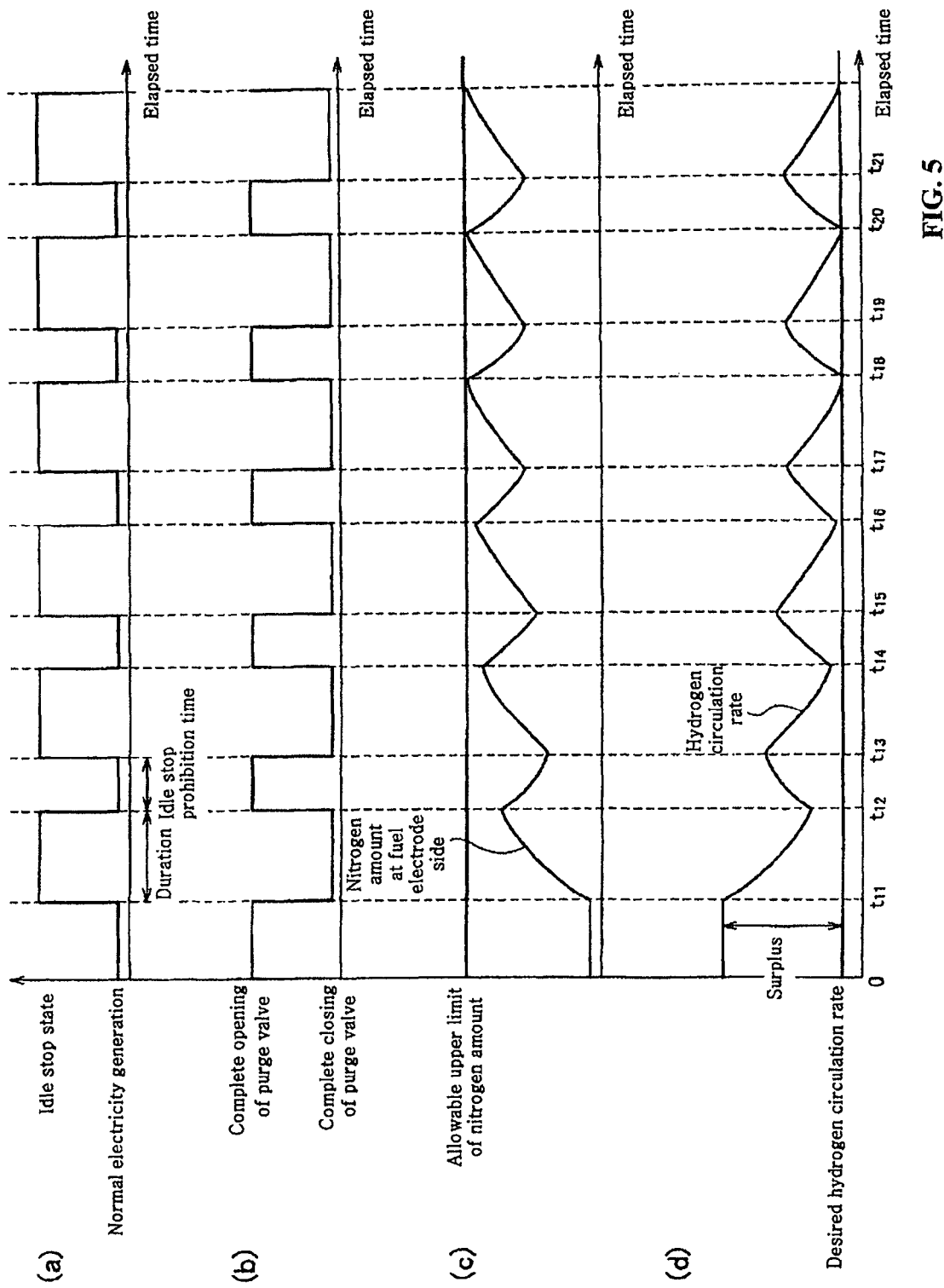
FIG. 5 is a time chart illustrating an operation of a fuel cell system constructed in accordance with a second embodiment of the invention, wherein: (a) shows a state of the fuel cell system; (b) shows a degree of opening for a purge valve; (c) shows an amount of nitrogen at a fuel electrode side; and (d) shows a circulation rate of hydrogen circulating via a gas circulation system.

FIG. 5 is a time chart showing the operation of the fuel cell system 2 in accordance with the second embodiment, wherein: (a) shows the state of the fuel cell system 2; (b) shows the degree of opening for the purge valve 42; (c) shows the amount of nitrogen at the fuel electrode side; and (d) shows the circulation rate of hydrogen circulating via the gas circulation system 30.

As shown in (a) and (b), if the three conditions are satisfied at time t11, and the fuel cell system 2 goes into the idle stop state, then the system control device 130 completely closes the purge valve 42. Thus, from time t11 to time t12, air at the oxidant electrode side cross leaks to the fuel electrode side, and the amount of nitrogen at the fuel electrode side is increased as shown in (c). Since oxygen contained in air having cross leaked from the oxidant electrode side reacts with hydrogen at the fuel electrode side so as to form water, the amount of hydrogen at the fuel electrode side is decreased. As a result, from time t11 to time t12, the circulation rate of hydrogen at the fuel electrode side is decreased as shown in (d).

The system control device 130 according to the second embodiment evaluates the circulation rate of hydrogen at time t11. Also, the system control device 130 evaluates the difference between the hydrogen circulation rate at time t11 and the desired hydrogen circulation rate. The system control device 130 then corrects the idle stop prohibition time from such a difference. In particular, as the difference between the hydrogen circulation rate and the desired hydrogen circulation rate is increased, the system control device 130 corrects the idle stop prohibition time so as to be shortened.

Generally, if the amount of nitrogen at the fuel electrode side is increased, then the gas circulation rate is decreased. Thus, it is preferable that the amount of nitrogen at the fuel electrode side is small. Conversely, so long as the electricity generation of the fuel cell 10 can be maintained, nitrogen may exist at the fuel electrode side. In other words, the hydrogen circulation rate should not fall short of the desired hydrogen circulation rate. Further, the idle stop prohibition time should be shortened so as not to fall short of the desired hydrogen circulation rate. Accordingly, as the difference between the hydrogen circulation rate and the desired hydrogen circulation rate is increased, the system control device 130 according to the second embodiment shortens the idle stop prohibition time.

Also as described above, the system control device 130 evaluates the difference between the hydrogen circulation rate and the desired hydrogen circulation rate. However, the system control device 130 is certainly not limited thereto. The system control device 130 may be configured to evaluate the ratio of the hydrogen circulation rate to the desired hydrogen circulation rate. In other words, so long as the system control device 130 can evaluate a surplus of the current hydrogen circulation rate with respect to the desired hydrogen circulation rate, the system control device 130 may be configured to evaluate the difference, the ratio or other indexes indicating the surplus.

At time t12, if the desired electricity generation amount is increased (e.g., by stepping on an accelerator pedal), then the fuel cell system 2 converts the idle stop mode into the normal electricity generation mode as shown in (a). The system control device 130 prohibits the conversion into the idle stop mode until the idle stop prohibition time elapses.

Here, the system control device 130 can set the circulation rate for the idle stop prohibition time to be higher than the circulation rate in the normal electricity generation after the idle stop prohibition time elapses. By increasing the circulation rate for the idle stop prohibition time to increase the surplus with respect to the desired hydrogen circulation rate, the idle stop prohibition time can be further shortened.

Also, the system control device 130 can set the pressure of the fuel electrode side for the idle stop prohibition time to be higher than the pressure of the fuel electrode side in the normal electricity generation after the idle stop prohibition time elapses. If the pressure of the fuel electrode side for the idle stop prohibition time is increased, then the hydrogen concentration at the fuel electrode side is increased. Further, the hydrogen circulation rate is also increased. As a result, the surplus with respect to the desired hydrogen circulation rate is increased, while the idle stop prohibition time can be further shortened.

It has been explained above that the system control device 130 evaluates the difference between the hydrogen circulation rates at time t11 and that the desired hydrogen circulation rate corrects the idle stop prohibition time. However, the system control device 130 may be configured to evaluate the difference between the hydrogen circulation rate at time t12 (i.e., at the time of converting into the normal electricity generation mode), while the desired hydrogen circulation rate corrects the idle stop prohibition time.

As described above, the fuel cell system 2 of the second embodiment can decrease discomfort to the system user while increasing the fuel efficiency similar to the fuel cell system 1 of the first embodiment. Also, while shortening the idle stop prohibition time, the discomfort to the system user can be decreased while the fuel efficiency can be increased.

By discharging a large amount of nitrogen during the idle stop prohibition time, the idle stop prohibition time can be shortened. Further, the idle stop prohibition time can be accurately evaluated.

The system control device 130 according to the second embodiment stores the minimum value of the circulation rate (the desired hydrogen circulation rate), which is required for maintaining the electricity generation of the fuel cell 10. The system control device 130 can then shorten the idle stop prohibition time as the surplus of the current circulation rate with respect to the desired hydrogen circulation rate is increased. If nitrogen cross leaks from the oxidant electrode side to the fuel electrode side and the amount of nitrogen at the fuel electrode side is increased, then the circulation rate is decreased. Also, if the amount of nitrogen at the fuel electrode side is increased, this means that the circulation rate by the gas circulation system 30 is insufficient, and the electricity generation performance of the fuel cell 10 cannot be maintained. Conversely, so long as the electricity generation at the fuel cell 10 can be maintained, nitrogen may exist at the fuel electrode side. In other words, the hydrogen circulation rate should not fall short of the desired hydrogen circulation rate. Further, the idle stop prohibition time should be shortened so as not to fall short of the desired hydrogen circulation rate. Accordingly, as the surplus of the current circulation rate with respect to the desired hydrogen circulation rate is increased, the idle stop prohibition time can be shortened. As a result, while shortening the idle stop prohibition time, discomfort to the system user can be decreased, and the fuel efficiency can be increased.

Further, the circulation rate for the idle stop prohibition time is set to be higher than the circulation rate in the normal electricity generation after the idle stop prohibition time elapses. By increasing the circulation rate during the idle stop prohibition time in order to increase the surplus with respect to the desired hydrogen circulation rate, the idle stop prohibition time can be further shortened.

The pressure of the fuel electrode side for the idle stop prohibition time is set to be higher than the pressure of the fuel electrode side in the normal electricity generation after the idle stop prohibition time elapses. If the pressure of the fuel electrode side during the idle stop prohibition time is increased, then the hydrogen concentration at the fuel electrode side is also increased. Further, the hydrogen circulation rate is also increased. As a result, the surplus with respect to the desired hydrogen circulation rate is increased, and the idle stop prohibition time can be further shortened.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing descriptions. All changes that come within the equivalent meaning and range of the claims are to be embraced within their scope. For example, embodiments of the invention can be configured such that the operation of the fuel cell stops in the idle stop mode. However, the electricity generation may not be completely stopped, and there may be generated a smaller amount of electricity than required for driving the vehicle. Further, the idle stop determination may be achieved by determining the three prescribed conditions only with the desired amount of electricity generation of the system.

Again, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A fuel cell system, comprising:
  a fuel cell having a fuel electrode to which a fuel gas is supplied and an oxidant electrode to which an oxidant gas is supplied, the fuel cell configured to generate electricity via a reaction between the fuel gas and the oxidant gas during a normal generation mode;
  a gas discharge unit for discharging a discharge gas from the fuel electrode of the fuel cell;
  an external load for receiving power from the fuel cell; and
  a controller unit operable configured to:
    while the fuel cell is operating in the normal generation mode, stop supply of the fuel gas and the oxidant gas to the fuel cell to enter a first idle stop mode from the normal generation mode responsive only to a condition that a driving power does not need to be supplied to the external load from the fuel cell; and
    each time the driving power needs to be supplied to the external load from the fuel cell while operating in an idle stop mode including the first idle stop mode:
      restart the supply of the fuel gas and the oxidant gas to the fuel cell to end the idle stop mode and return to the normal generation mode;
      calculate a length of an idle stop prohibition period, the length having a maximum time value dependent on a duration of the idle stop mode;
      begin the idle stop prohibition period upon the return to the normal generation mode;
      upon the return to the normal generation mode, re-enter into the idle stop mode responsive to the condition that the driving power does not need to be supplied to the external load from the fuel cell only if the idle stop prohibition period has lapsed; and
      calculate a correction time value that is dependent on at least one operating parameter of the fuel cell system after restarting the supply of the fuel gas and the oxidant gas, wherein the length of the idle stop prohibition period is a difference between the maximum time value and the correction time value.

2. The fuel cell system according to claim 1 wherein the controller unit is further configured to:
  shorten the length of the idle stop prohibition period from a first length calculated based on a first idle stop mode as a difference between the duration of the first idle stop mode and a duration of a subsequent idle stop mode becomes greater.

3. The fuel cell system according to claim 1, further comprising:
  a circulation unit for circulating the discharge gas from the fuel electrode and guiding the discharge gas back to the fuel electrode, wherein the controller unit is configured to:
  store a minimum value of a circulation rate of the circulation unit required for maintaining generation of the electricity of the fuel cell; and
  shorten the length of the idle stop prohibition period from a first length calculated based on a first idle stop mode as a surplus of a current circulation rate of the circulation unit with respect to the minimum value is larger in a subsequent idle stop mode.

4. The fuel cell system according to claim 3 wherein the controller unit is configured to control a first circulation rate of the circulation unit during the idle stop prohibition period to be higher than a second circulation rate in the normal generation mode after the idle stop prohibition period lapses.

5. The fuel cell system according to claim 3 wherein the controller unit is configured to:
control a first pressure of the fuel electrode for the idle stop prohibition period to be higher than a second pressure of the fuel electrode in the normal generation mode after the idle stop prohibition period lapses.

6. The fuel cell system according to claim 1 wherein the controller unit is configured to:
shorten the length of the idle stop prohibition period from a first length calculated based on a first idle stop mode as a flow rate of the discharge gas discharged by the gas discharge unit in a subsequent normal generation mode is increased.

7. The fuel cell system according to claim 6 wherein the gas discharge unit comprises:
a gas discharge pipe for discharging the discharge gas from the fuel electrode of the fuel cell; and
a control valve mounted to the gas discharge pipe to adjust a degree of opening; and wherein a first degree of opening for the control valve during the idle stop prohibition period is larger than a second degree of opening for the control valve after the idle stop prohibition period lapses.

8. The fuel cell system according to claim 7 wherein the controller unit is configured to:
calculate the correction time value based on at least one of the fuel inlet pressure measured at an upper stream of the control valve, the atmospheric pressure measured at a lower stream of the control valve and the fuel gas temperature measured at a fuel gas inlet.

9. The fuel cell system according to claim 1 wherein the controller unit is configured to:
calculate the correction time value based on at least one of the oxidant inlet pressure measured at an oxidant electrode side of the fuel cell and the fuel cell temperature of a main body of the fuel cell.

10. A fuel cell system including a fuel cell and a secondary cell, comprising:
means for stopping supply of a fuel gas and an oxidant gas to the fuel cell to enter a first idle stop mode while the fuel cell is operating in a normal generation mode responsive only to a condition that a driving power does not need to be supplied to an external load from the fuel cell;
means for restarting the supply of the fuel gas and the oxidant gas to the fuel cell to end an idle stop mode including the first idle stop mode and return to the normal generation mode each time the driving power needs to be supplied to the external load from the fuel cell while operating in the idle stop mode;
means for calculating a length of an idle stop prohibition period each time the driving power needs to be supplied to the external load from the fuel cell while operating in the idle stop mode, the length having a maximum time value dependent on a duration of the idle stop mode;
means for beginning the idle stop prohibition period when restarting the supply of the fuel gas and the oxidant gas to end the idle stop mode and return to the normal generation mode;
means for, upon the return to the normal generation mode, re-entering into the idle stop mode responsive to the condition that the driving power does not need to be supplied to the external load from the fuel cell only if the idle stop prohibition period has lapsed; and means for calculating a correction time value that is dependent on at least one operating parameter of the fuel cell system after restarting the supply of the fuel gas and the oxidant gas, wherein the length of the idle stop prohibition period is a difference between the maximum time value and the correction time value.

11. The fuel cell system according to claim 10, further comprising:
means for controlling a circulation rate of the discharge gas such that a first circulation rate during the idle stop prohibition period is higher than a second circulation rate in the normal generation mode after the idle stop prohibition period lapses.

12. A method of controlling a fuel cell system including a fuel cell, comprising:
stopping, using a controller, supply of a fuel gas and an oxidant gas to the fuel cell to enter a first idle stop mode while the fuel cell is operating in a normal generation mode responsive only to a condition that a driving power does not need to be supplied to an external load from the fuel cell, the fuel cell having a fuel electrode to which the fuel gas is supplied and an oxidant electrode to which the oxidant gas is supplied and the fuel cell configured to generate electricity via a reaction between the fuel gas and the oxidant gas during the normal generation mode and the fuel cell system including a gas discharge unit for discharging a discharge gas from the fuel electrode of the fuel cell and an external load for receiving power from the fuel cell; and
each time the driving power needs to be supplied to the external load from the fuel cell while operating in an idle stop mode including the first idle stop mode:
restarting the supply of the fuel gas and the oxidant gas to the fuel cell using the controller to end the idle stop mode and return to the normal generation mode;
calculating, using the controller, a length of an idle stop prohibition period, the length having a maximum time value dependent on a duration of the idle stop mode;
beginning the idle stop prohibition period when restarting the supply of the fuel gas and the oxidant gas upon the return to the normal generation mode;
upon the return to the normal generation mode, re-enter into the idle stop mode responsive to the condition that the driving power does not need to be supplied to the external load from the fuel cell only if the idle stop prohibition period has lapsed; and
calculating a correction time value that is dependent on at least one operating parameter of the fuel cell system after restarting the supply of the fuel gas and the oxidant gas, wherein the length of the idle stop prohibition period is a difference between the maximum time value and the correction time value.

13. The method according to claim 12 wherein calculating the idle stop prohibition time period includes:
shortening the length of the idle stop prohibition period from a first value calculated based on a first idle stop mode as a difference between the duration of the first idle stop mode and a duration of a subsequent idle stop mode becomes greater.

14. The method according to claim 12, further comprising:
circulating the discharge gas from the fuel cell and back to the fuel cell; and
shortening the length of the idle stop prohibition period from a first value calculated at least partially based on a difference between a circulation rate of a first idle stop mode and a minimum circulation rate as a surplus of the circulation rate with respect to the minimum circulation rate in a subsequent idle stop mode is larger.

15. The method according to claim 12 wherein calculating the length of the idle stop prohibition period includes:
calculating the length of the idle stop prohibition time based at least partially on a flow rate of the discharge gas in a first idle stop prohibition period; and the method further comprising:
shortening the length of the idle stop prohibition period as the flow rate of the discharge gas in a subsequent normal generation mode increases.

16. The method according to claim 15 wherein the fuel cell system comprises a control valve in a path of the discharge gas, the method further comprising:
controlling a rate of discharge gas by a degree of opening of the control valve wherein a first degree of opening occurs during the idle stop prohibition period and a second degree of opening occurs when the idle stop prohibition period lapses, the first degree of opening being larger than the second degree of opening.

17. The method according to claim 16, further comprising:
calculating the correction time value based at least partially on at least one of the fuel inlet pressure measured at an upper stream of the control valve, the atmospheric pressure measured at a lower stream of the control valve and the fuel gas temperature measured at a fuel gas inlet.

18. The method according to claim 12, further comprising:
calculating the correction time value based at least partially on at least one of the oxidant inlet pressure measured at an oxidant electrode side of the fuel cell and the fuel cell temperature of a main body of the fuel cell.

19. The method according to claim 12, further comprising:
discharging a discharge gas for the length of the idle stop prohibition period after restarting the supply of the fuel gas and the oxidant gas.

20. The fuel cell system according to claim 1, wherein the at least one operating parameter includes at least one of fuel inlet pressure, atmospheric pressure, fuel gas temperature, oxidant inlet pressure, or fuel cell temperature data.

21. The fuel cell system according to claim 1 wherein the controller is configured to calculate the correction time value by:
multiplying the maximum time value by an idle stop prohibition time ratio;
generating a discharge rate from the gas discharge unit based on at least one of a pressure sensor value, an atmospheric pressure sensor value or a temperature sensor value;
generating a subtraction time ratio based on the discharge rate; and
multiplying the subtraction time ratio by a control period to generate the correction time value.

22. The fuel cell system according to claim 10 wherein the means for calculating the correction time value comprises:
means for multiplying the maximum time value by an idle stop prohibition time ratio;
means for generating a discharge rate from the gas discharge unit based on at least one of a pressure sensor value, an atmospheric pressure sensor value or a temperature sensor value;
means for generating a subtraction time ratio based on the discharge rate;
means for multiplying the subtraction time ratio by a control period to generate the correction time value.

23. The fuel cell system according to claim 1 wherein the external load comprises a driving motor and a battery coupled to the fuel cell for receiving power from the fuel cell, wherein the driving power does not need to be supplied to the external load from the fuel cell when a value detected by a car speed sensor is less than a first predetermined value, the expected power consumption of the driving motor is less than a second predetermined value, and a residual capacity of the battery is more than a third predetermined value.

24. The fuel cell system according to claim 1 wherein the gas discharge unit comprises:
a gas discharge pipe for discharging the discharge gas from the fuel electrode of the fuel cell; and
a control valve mounted to the gas discharge pipe to adjust a degree of opening; and wherein the controller unit is configured to:
calculate the correction time value based on at least one of the fuel inlet pressure measured at an upper stream of the control valve, the atmospheric pressure measured at a lower stream of the control valve and the fuel gas temperature measured at a fuel gas inlet.

\* \* \* \* \*